Dec. 1, 1964  H. W. WYLIE  3,159,110
MOTORIZED STAGING SUSPENDING AND ADJUSTING CARRIER
Filed Nov. 27, 1962  6 Sheets-Sheet 1
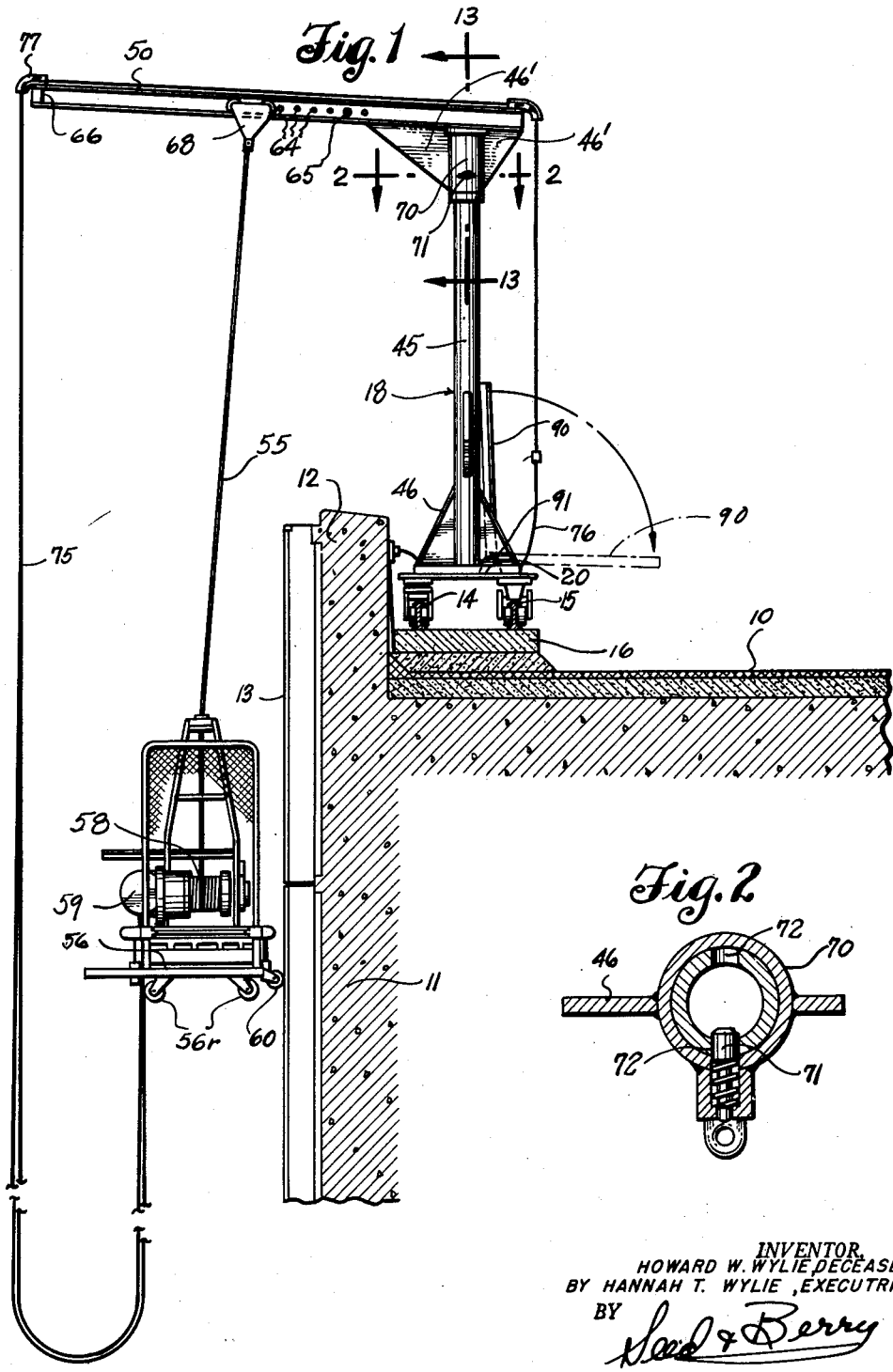
INVENTOR.
HOWARD W. WYLIE, DECEASED
BY HANNAH T. WYLIE, EXECUTRIX
BY Seed & Berry
ATTORNEYS

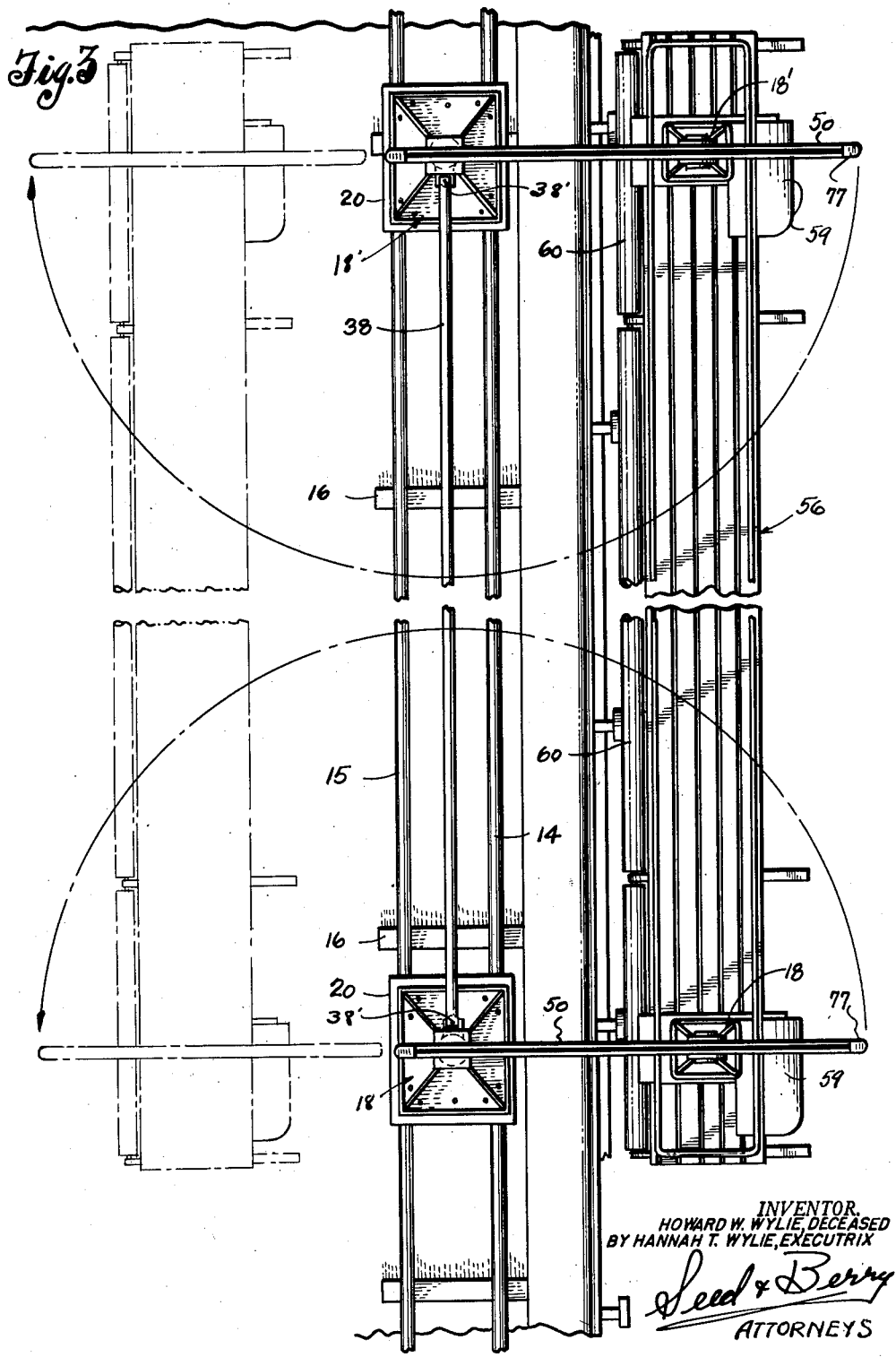

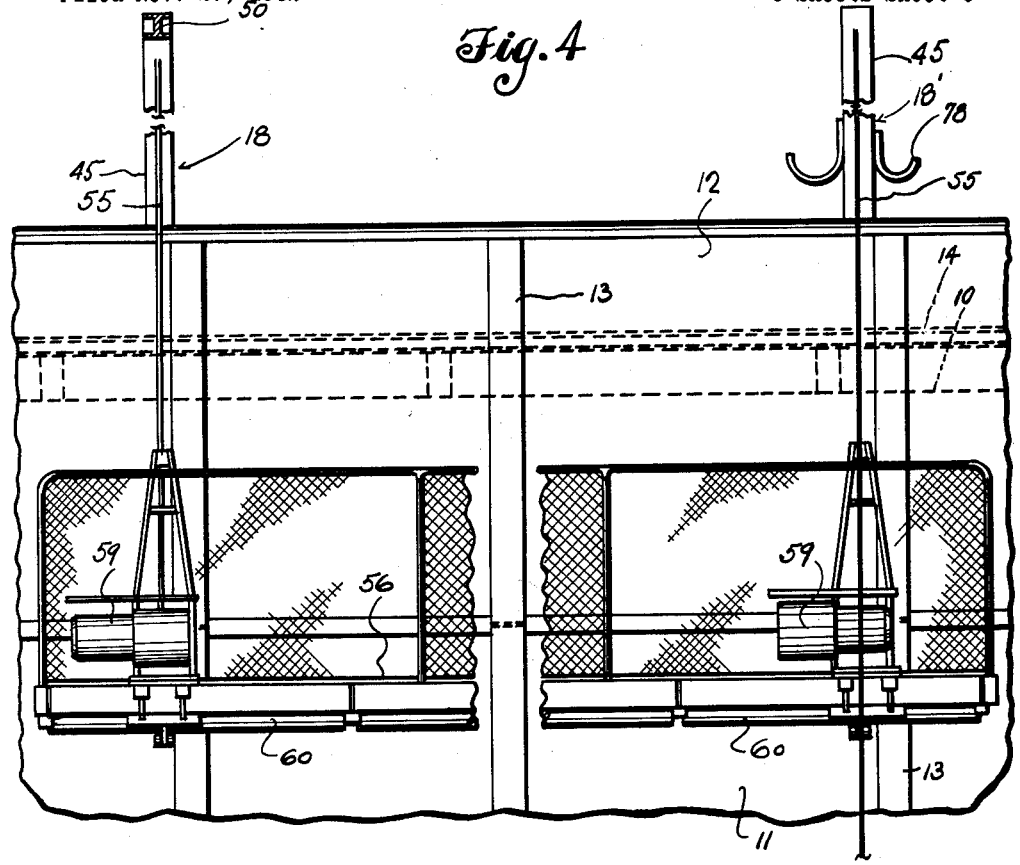
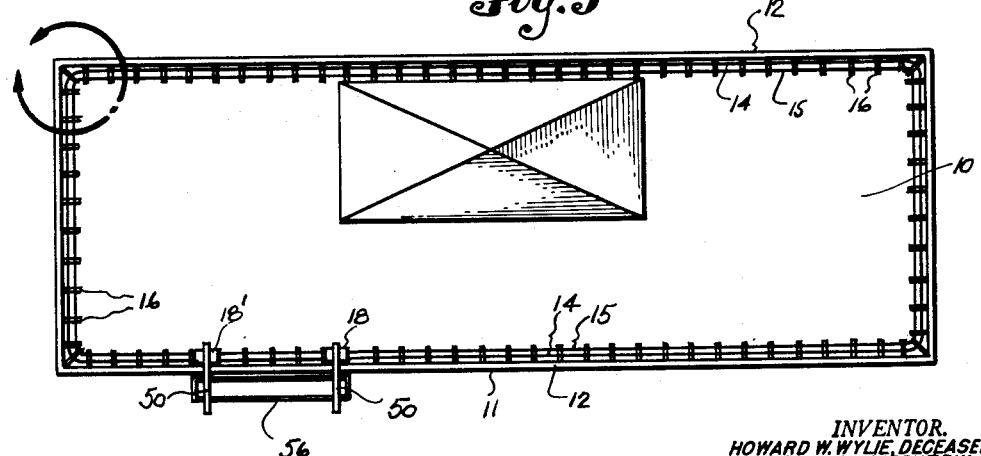

INVENTOR.
HOWARD W. WYLIE, DECEASED
BY HANNAD T. WYLIE, EXECUTRIX

ATTORNEYS

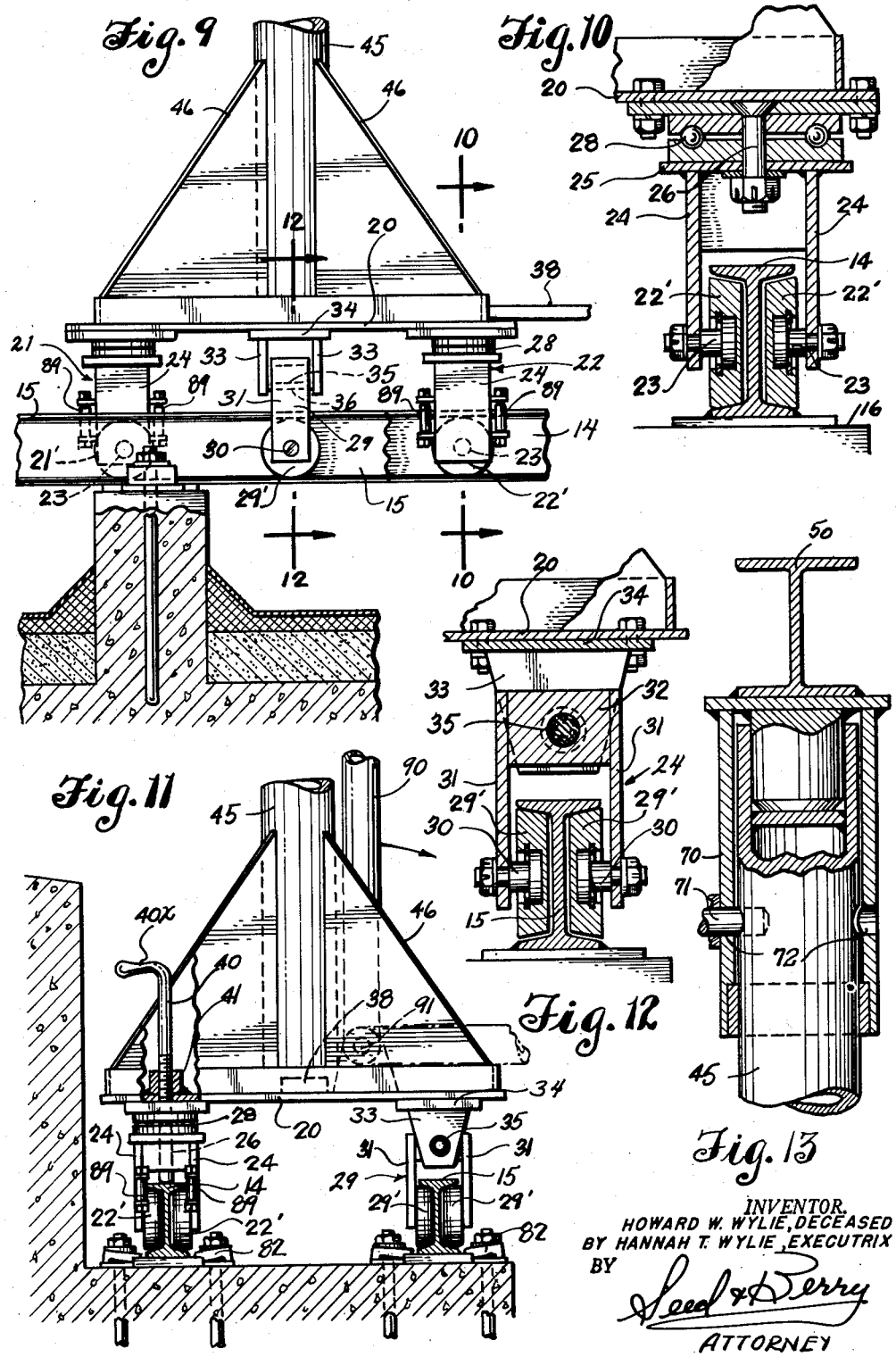

Dec. 1, 1964 H. W. WYLIE 3,159,110
MOTORIZED STAGING SUSPENDING AND ADJUSTING CARRIER
Filed Nov. 27, 1962 6 Sheets-Sheet 6
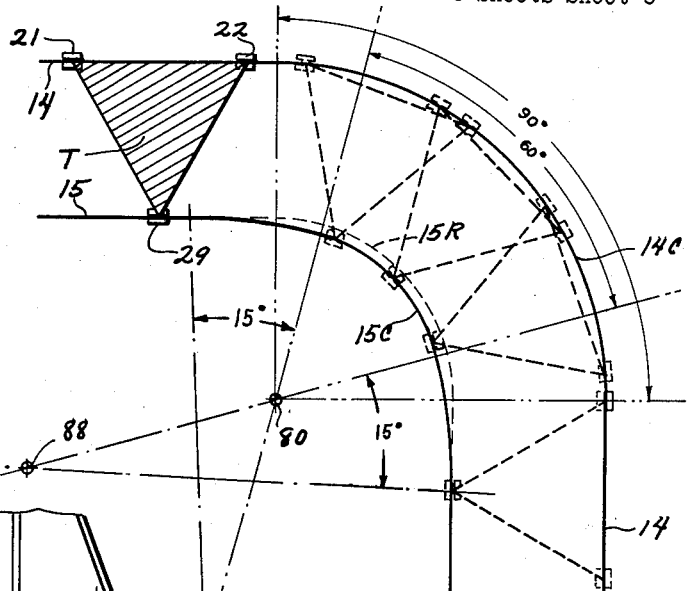
Fig. 14
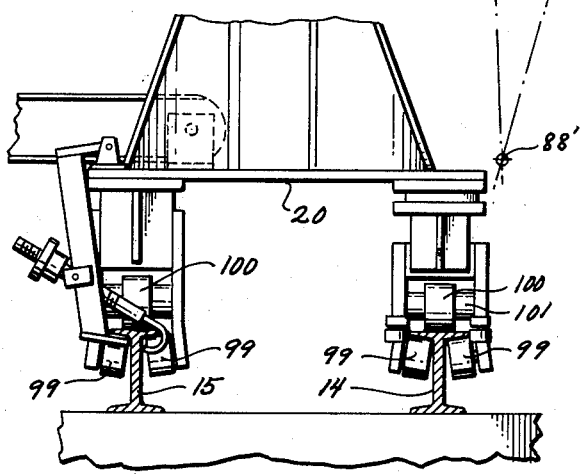
Fig. 15
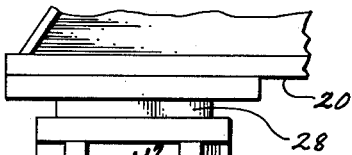
Fig. 16
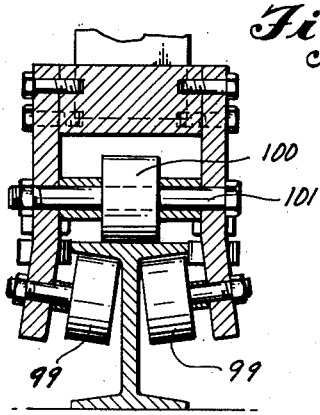
Fig. 17
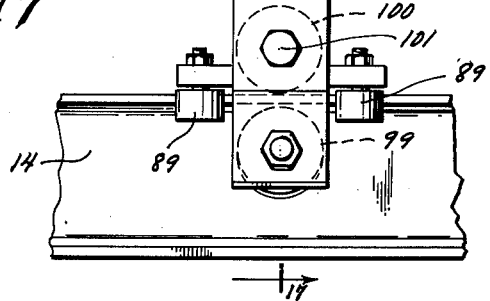
INVENTOR.
HOWARD W. WYLIE, DECEASED
BY HANNAH T. WYLIE, EXECUTRIX
BY *Seed & Berry*
ATTORNEYS

United States Patent Office 3,159,110
Patented Dec. 1, 1964

3,159,110
MOTORIZED STAGING SUSPENDING AND ADJUSTING CARRIER
Howard W. Wylie, deceased, late of Seattle, Wash., by Hannah T. Wylie, executrix, 2615 Western Ave., Seattle, Wash.
Filed Nov. 27, 1962, Ser. No. 240,480
9 Claims. (Cl. 104—246)

This invention relates to a motorized staging suspending and elevation adjusting carrier of a type especially designed for use in connection with the work of cleaning, washing, painting and other servicing treatment of the outside wall surfaces of multi-storied buildings. More particularly, it pertains to improvements in a traveling carrier or car and a trackway on which it operates.

This application is a continuation-in-part of application Serial No. 824,979, filed July 6, 1959, now abandoned.

It is the principal object of this invention to provide a wheel equipped carrier or car adapted for functional support and travel on a track-way of an improved construction that may, for example, be mounted on the roof structure or top of the building to be worked on, and which carrier may comprise one or more stanchions equipped with booms for the suspending therefrom of a workman's platform or staging at the side of the building and which platform can be raised and lowered as may be required, by the action of a cable winding means.

More specifically stated, the object of the present invention is to provide certain improvements in design of the trackway and in the wheel mountings of the carrier that permit the carrier to be easily rolled along the trackway and around sharp curves at the corners of the building and to provide means whereby the carrier wheels are maintained in proper holding and guiding contact with the two rails of the trackway.

Another object of this invention is to so design the trackway that its corner forming portions may be sharply curved without detriment to easy travel of the wheeled trucks of the carrier about them.

Still further objects of the present invention reside in the various details of construction of parts and in the combination and mode of use of the device as will hereinafter be fully described.

The invention consists in the novel construction and in the adaptation and combination of parts hereinafter described and claimed.

In the accompanying drawings:

FIGURE 1 is a vertical sectional view of a fragmentary part of the roof and a sidewall of a building, and showing one embodiment of the trackway and carrier of the present invention mounted on said roof. A staging which said carrier supports is here shown suspended from the carrier in the working position occupied when the sidewall of the building is being serviced.

FIG. 2 is a horizontal sectional view drawn to an enlarged scale on line 2—2 of FIG. 1.

FIG. 3 is a fragmentary top plan view of the invention, and employing broken and full lines to indicate the staging in said working and in a parked position, respectively, as davits with which the carrier is equipped are swung through the indicated arcs between outboard and inboard locations.

FIG. 4 is a fragmentary elevational view of the staging shown in its FIG. 1 position.

FIG. 5 is a reduced-scale top plan view of a building equipped with the trackway and carrier of the present invention, and with the staging shown in the working position of FIGS. 1 and 4.

FIG. 9 is a fragmentary side elevational view, and FIG. 11 is a fragmentary end elevational view, of the stanchion member and wheeled truck for one of the carrier's two davits.

Figure 6:
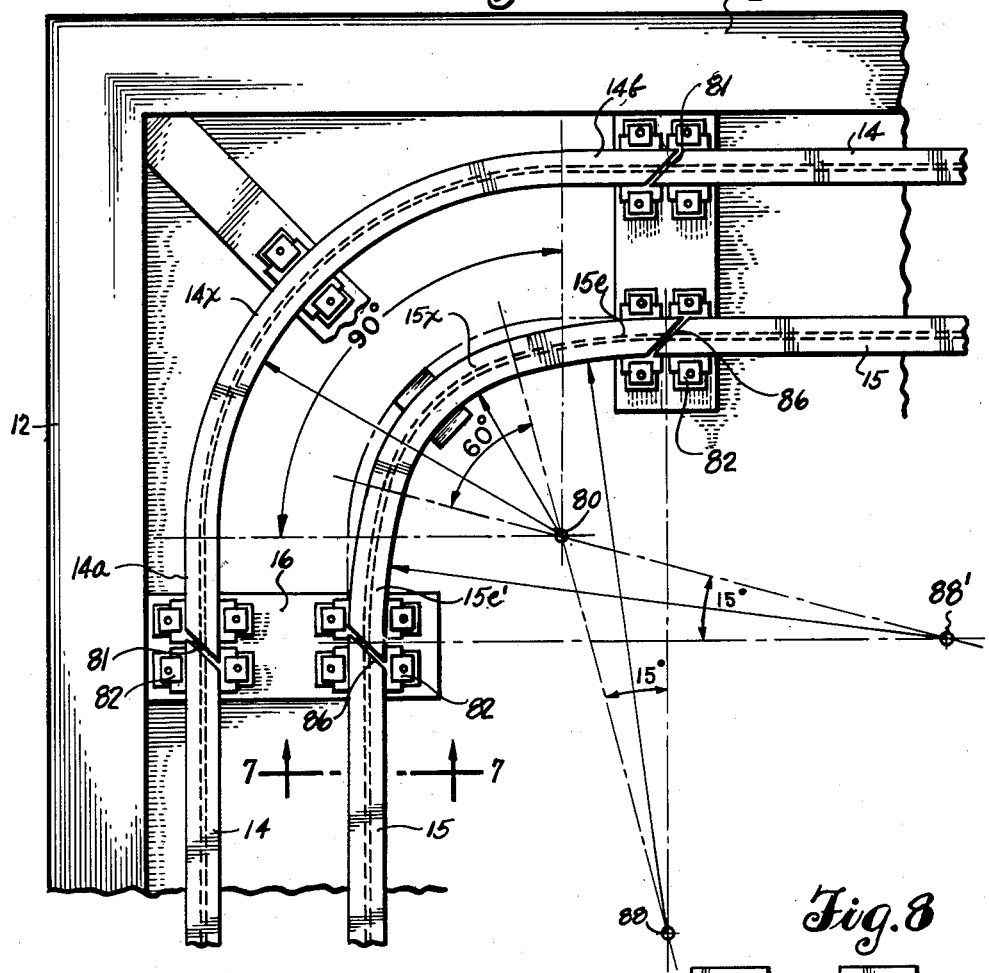
FIG. 6 is a fragmentary top plan view drawn to an enlarged scale to detail the portion of the installation circled in FIG. 5.

FIGS. 10 and 12 are fragmentary transverse vertical sectional views drawn to an enlarged scale on lines 10—10 and 12—12, respectively, of FIG. 9.

FIG. 13 is a fragmentary vertical sectional view on line 13—13 of FIG. 1, employing the same scale as that of FIG. 2.

FIG. 14 is a diagrammatic plan view of a corner section of the trackway, particularly to illustrate centers about which the curves of the track rails are developed and a triangular relationship of the wheels of a truck.

FIG. 15 is a fragmentary transverse vertical sectional view showing a second embodiment of a wheel arrangement for the trucks.

FIG. 16 is a fragmentary side elevational view thereof drawn to an enlarged scale; and FIG. 17 is a fragmentary transverse vertical sectional view on line 17—17 of FIG. 16.

Referring to said drawings, the flat roof of a typical building on which the present apparatus is to be used is designated by the numeral 10, and one face or sidewall of such building is denoted by 11. The sidewall rises above the level of the roof to form a parapet 12, and as here illustrated has mullions 13 extending the full height of the sidewall.

Supported on the flat roof 10 by means of transverse ties 16 is a continuous trackway located so as to be in close proximity to the parapet. This trackway, in order to generally follow the plan profile of the roof, presents a number of straight sections joined by curved corner sections, and comprises two rails lying in spaced paralleling relation. In a manner which will be hereinafter described, it should however be here noted that the arcs given to the two rails in said curved corner sections do not have a common center and hence are not precisely parallel. The rail having the longer arc is designated by 14 and for clarity in description will be hereinafter referred to as the outside rail. The other rail 15 will be termed the inner rail. Rail 14 perforce is proximal to and rail 15 distal to the parapet. The rails are of heavy I-beam form, as clearly illustrated in FIGS. 9 through 15, and are joined end to end and anchored to the ties 16 by suitable means hereinafter described.

A car or carrier is mounted for travel on the trackway. This car is comprised of two wheeled trucks linked together, and each said truck functions as the supporting foot for a respective one of two davits. These davits are designated in their entirety by 18 and 18'. The two davits, and the two wheeled trucks, are alike in construction and thus a description of one davit and truck will suffice for the other.

The davit comprises a post or stanchion 45 and a boom arm 50, with the stanchion being rigid with a deck plate 20 of the related wheeled truck. The wheels are in sets, two or three wheels to a set. Two of these sets are provided for that side of the truck which rides on the outside track rail 14, being located one at one end extremity and the other at the other end extremity of the deck plate 20. One set is provided for the side of the truck which rides on the inside rail 15, located at a centered point thereon equidistant from the two sets related to the rail 14. The arrangement having two wheels to a set is detailed in FIGS. 9 through 12, and that having three wheels to a set is detailed in FIGS. 15 through 17. The two wheels of the two-wheel sets, and two of the three wheels of the three-wheel sets are located one at one side and the other at the other side of the web of the concerned track rail in rolling contact with a related flange of the rail.

First describing said arrangement of FIGS. 9 through 12, each set of wheels is carried by a mounting unit. For the outside rails 14 these wheel-mount units are designated in FIG. 9 at 21 and 22. The paired wheels 22'—22' of unit 22 have a diameter moderately less than the span between the rail's upper and lower flanges so as to be held by the latter against vertical displacement, albeit providing sufficient clearance that the rolling contact with the confining flanges is only with one flange at a time. The wheels are rotatably mounted on horizontal and axially aligned spindle bolts 23—23 that are rigidly fixed in and extend inwardly from the lower ends of rail-straddling brackets or plates 24—24 that are fixed rigidly to and extend downwardly from a horizontal top plate 25 that is mounted for swivel motion about a vertical bolt 26 that is fixed to and extends downwardly from the underside of plate 20. A ball bearing unit, designated generally at 28 in FIG. 10 is disposed between plates 25 and 20. The pivot bolt 26 attaches this wheel mounting unit to the base plate 20.

It is to be understood that the same arrangement of parts as shown in FIG. 10 also mounts the paired wheels 21'—21' of the wheeled unit at the other end of the plate 20 for rolling travel along rail 14.

The single wheel-mount unit for said other side of the deck plate 20, namely the unit related to the inside rail 15, is denoted by 29, and its paired wheels by 29'—29'. These wheels have the same diameter as the wheels 21' and 22' and similarly occupy positions at opposite sides of the related rail confined between upper and lower flanges of the rail.

These wheels 29'—29' are mounted as in FIG. 12 for rotation on stub spindle bolts 30—30 that are fixed in and extend inwardly toward the rail web from the lower end portions of legs 31 that are fixed to and extend downwardly in straddling relation to the rail 15 from a mounting block 32. The block 32 is disposed between downwardly directed vertical plates 33—33 fixed at their upper ends to a horizontal plate 34 that is bolted or otherwise rigidly fixed to the under face of plate 20. This arrangement of parts for the mounting of wheels 29'—29' is as shown in FIGS. 9 and 12 and in the latter view it is to be observed that the block 32 is mounted for wrist motion on a horizontal pivot pin 35 that extends between the plates 33—33, thus the paired wheels 29'—29' can swing bodily with their rail-straddling legs 31 about the center of the pin 35 as a wrist axis transversely to the direction of the trackway rail to meet any discrepancy in rail spacing in travel of the carrier about a curve. The wheel mountings for each truck provide a three point support at each end of the carrier. The axial line of the stanchion lies within the confines of a triangle having its sides projected between said three points. It is to be understood that the wheel or roller unit 29 that travels on the inside rail 15 need not necessarily be swingably mounted, as by the horizontal pivot pin 35 of FIG. 12, but may be rigidly fixed, if outoutside and inside rail relationship at the curved corner sections of trackway is accurately established. This will later be explained in connection with the description of FIGS. 14 through 17.

It is to be noted that the two stanchions 18—18' are joined in predetermined spacing by a horizontal link or bar 38 extended between them as shown best in FIG. 3; this link being pivotally joined at its opposite ends to the standards 18 as shown at 38.

It will be understood by reference to the showing of parts in FIG. 1, that the weight on the staging as suspended from the stanchions will be taken by the outside rail 14 through the pairs of wheels 21'—21' and 22'—22', while the resistance to upward and outward tilting of the stanchions fixed to the plates 20 will be resisted by the paired wheels 29'—29' mounted by rail 15. All wheels are guided in their rolling travel by the rails which they engage and all are held by their mountings for rolling travel either on upper or lower flanges of the rails. This will be understood by reference to the showing of parts in FIGS. 10 and 11 which also show all wheels to be flangeless and slightly conically formed to best adapt them to the surfaces of the rail flanges.

After a position for suspension of the staging from the stanchion booms has been once established, then the position of the carrier on the trackway can be fixed or retained by a clamp screw 40 which has been shown in FIG. 11 to be threaded downwardly through a bearing or block 47 on the plate 20 for tightening at its lower end against the top surface of the outside rail 14. The screw 40 is formed with a laterally directed arm 40x at its upper end which is grasped for easy tightening and loosening the screw.

The davits will now be fully described.

Erected centrally on each of the base plates 20 is the stanchion 45. This is a vertical, tubular standard of a predetermined height. These are braced and rigidly secured at their lower ends by means of a plurality of triangular web plates 46 that are arranged at 90° intervals about the standards and welded thereto and to the plates 20 as well shown in FIG. 9.

Mounted on the upper ends of the standards are the radially and slightly upwardly inclined beams or booms 50 of I-beam form, as shown in FIG. 13. These are of such length as to extend substantially outwardly beyond the vertical plane of the building wall when turned in that direction, as will be understood by their showing in FIGURE 1.

Suspended from these booms 50 by means of cables 55 is the workman's staging designated in its entirety by 56; the cables being extended upwardly from cable winding drums 58 that are mounted on motor bases fixedly secured to the staging. These drums are adapted to be individually driven by electric motors 59 to wind in or pay out the cables as may be desired thus to raise or lower the staging. At its inside edge, the staging platform is equipped with rollers as at 60 in FIG. 1 for rolling travel on the vertical mullions 13 to retain the staging a predetermined definite distance from the wall surface.

The two outwardly extending booms 50, which are of I-beam form in cross-section as shown in FIG. 13, have wheeled trolleys 68 mounted for travel therealong between the flanges of the boom as shown in FIG. 1 and it is to these trolleys that the upper ends of the staging suspending cables 55 are connected. These trolleys automatically travel toward the stanchions under the pull or weight of the staging and thus the staging is caused to drift toward the building wall, as will be understood by reference to FIG. 1. However, to limit this automatic inward travel of the trolleys on their respective booms, the latter are formed therealong with a succession of holes 64 in any one of which a stop as at 65 can be selectively inserted to be engaged by the trolley. Also, stops 66 are fixed to the booms at their outer ends to limit the outward travel of the trolleys thereon.

The outwardly extending booms are each equipped at their inner ends with a cylindrical mounting hub portion 70 that rotatably contains the upper end portion of the stanchion 45 therein and each hub is suitably braced by webs 46' welded to hub and boom, and also each hub is equipped with a radially mounted spring-pressed latch bolt 71 that can be selectively engaged in holes 72 in the stanchion at inside and outside as in FIG. 2 or 13, to hold the booms 50 in their full line outward positions or in their dotted line inwardly extending positions.

Current may be supplied to the electric motors on the staging, for driving the cable winding drums for raising or lowering the staging, through a transmission cable 75 which is shown in FIG. 1, to lead from a supply cable 76 on the roof, outwardly along the boom 50 and is then suspended through a guide 77 at the outer end of the boom as a depending loop that leads upwardly at its lower end to the motors. As an alternative, the supply of electrical cable might be supplied through a coil adapted to be supported by hooks 78 applied to one of the stanchions as shown in FIG. 4.

Figure 7:
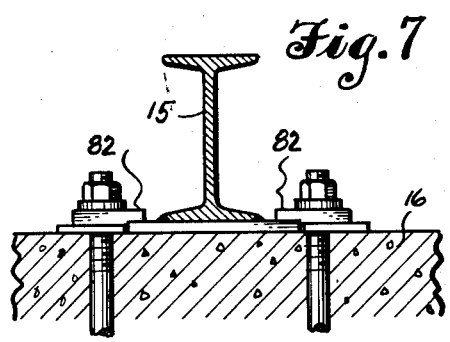
FIG. 7 is a fragmentary vertical sectional view drawn to an enlarged scale on line 7—7 of FIG. 6.
Figure 8:
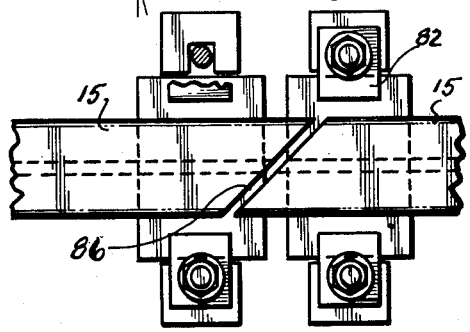
FIG. 8 is a fragmentary top plan view, employing the same scale, to detail a rail joint.

A characterizing feature of this particular invention resides in the trackway as formed by rails 14 and 15, and especially in its sharply curved corner construction, as has been illustrated best in FIGS. 6 and 14. In these views it is to be observed that the opposite side and end track sections lead into or join with corner sections that are curved sharply but in such manner as to provide for easy travel of the carrier comprised by the two joined, wheeled trucks about the corners of the trackway. It will be observed particularly by reference to FIG. 6 that the outside rail of the corner section of trackway is formed by an I-beam 14x. At its opposite ends this section of rail terminates in straight portions 14a–14b that are in alignment with the straight side and end wall rails 14 with which they join, but between these straight end portions, the rail section 14x is curved through 90° about a center point 80 that is located at the inside of the inside rail and as seen in FIG. 6. The straight opposite end portions 14a–14b of this curved rail section 14x are joined, respectively, with the ends of the corresponding rails 14 of the side and end track sections in beveled joints, as shown at 81, and the joined ends are secured upon and to the supports 16 by clamps, as at 82 in FIGS. 6, 7, and 8, that permit limited relative endwise movement of the joined parts, to compensate for contraction and expansion, as well as to eliminate abrupt joints to be engaged by the rollers in passing thereover.

Likewise, the inside rails of the straight side and end wall track sections are joined at the corners by a respective curved rail section 15x with beveled end joints 86 and secured in the same way. This rail section 15x has its opposite end portions and central portion curved about different centers using radii of different lengths; for example, as seen in FIG. 6, the opposite end portions 15e–15e', respectively are curved about centers 88 and 88' located well within the side and end rails, and each portion extends through an arc of approximately 15° while the medial portion 15x is curved about the previously mentioned center point 80 and it extends only through an arc of approximately 60°. The radii of these curvatures is such that the spacing of inside rails from the outside rails at the corners of the building increases from the ends of the curve toward its center and the degree of this increase is so predetermined as to accommodate the inside and outside wheels of the trucks to travel about the curve without binding.

In FIG. 14 there is diagrammatically illustrated the variable spacing of inside and outside rails of the trackway in the corner curves. In this view the hatched triangular area T represents what may be the base plate 20 of a truck that is mounted on the trackway rails 14 and 15 by the three wheel mounting units 21–22 and 29 as previously described.

In the curve, the center line of the outside rail 14 is designated by reference numeral 14c; the center line of the inside rail 15 is designated by numeral 15c; centers of curvature, as in FIG. 6 are designated by reference numerals 80, 88 and 88' and the limits of curved sections of these rails is defined by the radial lines diverging from center point 80 and points 88 and 88'.

In this view the triangular relationship of the three wheel units mounting the truck T is established at vertex areas of the shaded triangle T. The wheel units 21 and 22 travel on rail 14 as previously explained. The location of wheel unit 29 is at the vertex area over the line 15c of rail 15.

In accordance with such showing of the rail and wheel units, it will be seen that the curve of the inner rail 15 is so developed that a very gradual and progressive increase in the spacing between the rails occurs through an "opening" portion of the travel of the inner wheel unit 29 about its curved path. The start thereof coincides with the entry of the leading one of the two outer wheel units onto the curving portion of its rail 14. The end point of this spacing increment coincides with the entry of the trailing one of the two outer wheel units onto the curving portion of its rail 14. A converse gradual and progressive decrease in the spacing occurs through a "closing" portion of the travel of the inner wheel unit about its curved path. The start thereof coincides with the entry of said leading one of the two outside wheel units onto the following straight section of its track 14, and ends as the trailing one of such outside wheel units reaches the straight section.

In FIG. 14 the dash line 15R, that is shown at the inside of the rail-designating line 15C, is curved about center point 80 and the distance from it to line 15C indicates the variation in spacing of the inside from the outside rail in making the curve.

The arcuate sections of the two rails is constant through a 60° angle. The curvatures of opposite end portions of the inside rail extend through arcs of approximately 15° about centers 88 and 88', each on a radius of sufficient length predetermined as correct for travel of the inside wheel unit thereon without binding.

In order to hold the inside carrier trucks in proper alignment with the rail 14 in making a corner turn, each of the mounting frames for the pairs of wheels 21'—21' and 22'—22', is equipped at front and rear ends, with paired vertically directed rollers 89—89, as has been shown in FIGS. 9 and 11. These are so positioned as to engage in rolling contact with outside edges of the opposite top flanges of rail 14 thus to guide these units of the carrier in its travel.

When the staging is not in use, it can be elevated to a level above the parapet and then by successively swinging the booms inwardly, it can be swung to a position over the roof and then lowered. It is seen in FIG. 1 that the staging is equipped with rollers 56r at its underside which will be helpful in moving same on the roof if such is desired.

While in the present instance there is described the invention as employing two paired stanchions, it is to be understood that a single stanchion might be employed in a like manner for suspending a basket-form of scaffold carrying a hoisting mechanism which scaffold could be used by one workman, as a means for reaching building wall areas that are not accessible when the long staging platform is employed.

It is also a feature of this invention that parking arms for support of the staging 56 are mounted on the carrier at each truck, as seen in FIGS. 1 and 11. Each consists of a straight lever 90 pivoted at its inner end as at 91 to the deck plate 20 for movement between an upright out-of-the-way position and a lowered operating position. When the platform is to be parked, the arms 90 occupy horizontal positions and bear upon the deck plates 20, as indicated in phantom in FIG. 1. Then the platform is lowered onto these arms.

In FIGS. 15, 16 and 17 there is illustrated an alternative construction for the wheel units. These are adapted for guided travel on the trackway as previously described.

In this embodiment the three-wheel units are mounted in the same triangular arrangement as the first-described embodiment, but whereas the two outside units are swivelly mounted, the inside wheel unit is not mounted for swing motion. Each of the three units has much the same furcate form so as to provide a pair of spaced apart depending arms straddling the related rail. Each of these arms carries an axle on which a respective one of two non-rise wheels 99 is journaled, and positions such wheels so that they have rolling contact with the underside of a related one of the two upper flanges of the rail. The journal axis of the wheels desirably parallels the surface of the related flange against which the wheel bears. A third wheel 100 complements the paired non-rise wheels 99, occupying a position between the two fork-arms. Such wheel rolls along the top face of the concerned rail 14 or 15, as the case may be, and receives a journal mounting from an axle 101, spacers being provided to center the wheel upon the axle. In the embodiment here described, guide rollers 89—89 like or similar to those provided in the first-described embodiment are or may be provided at both sides of the rail 14, located fore and aft of the transverse vertical plane occupied by the related two paired wheels 99 and their complementing wheel 100.

It is thought that the invention and the manner of its operation will have been clearly understood from the foregoing detailed description of the now-preferred embodiments.

What is claimed is:

1. The combination of a two-rail railway track having at least one curved run and two straight runs joined by said curved run, said rails being of I-beam formation, and a wheeled truck mounted for travel on said track, said truck having a deck plate spanning the track, the wheels of the truck being in sets with each set suspended from the deck plate and including, in each set, a pair of wheels lying one wheel of the pair at one side and the other wheel of the pair at the other side of the web of a concerned rail and each mounted to rotate about a respective horizontal axis transverse to the track placing the wheel in rolling contact with a flange of the rail, two of said sets of wheels being provided for the outside rail one located adjacent one end and the other located adjacent the other end of the deck plate and with each of such two sets being carried by the deck plate for bodily swivel movement about a vertical axis fixed in relation to the deck plate, one of said sets of wheels being provided for the inner rail placed to occupy a transverse vertical plane lying between said two wheel sets provided for the outside-rail and projected normal to the longitudinal vertical plane occupied by the latter two sets.

2. Structure according to claim 1 in which the plane occupied by said wheel set which is provided for the inner rail is equi-distant from the two wheel-sets provided for the outer rail.

3. Structure according to claim 1 in which the set provided for the inner rail is suspended from the deck plate in a manner permitting the set to swing bodily about a horizontal axis located above and extending parallel to the rail.

4. Structure according to claim 1 in which the pair of wheels in each set is complemented by a third rotatively mounted wheel having rolling contact with the top surface of the concerned rail.

5. Structure according to claim 1 in which the wheels each have a diameter only moderately less than the span between upper and lower flanges of the concerned rail so as to be confined by said flanges against vertical displacement with respect to the rail.

6. Structure according to claim 1 having two of said trucks spaced longitudinally of the track and joined one to the other by a link having articulating connection with the trucks, and wherein each of said trucks provides footing support for a respective davit.

7. Structure according to claim 1 in which the plane occupied by said wheel-set which is provided for the inner rail is equi-distant from the two wheel-sets provided for the outer rail, and wherein two rails of the track extend parallel to one another along the straight runs of the track and, along the curved run, are characterized in that the rail which lies at the outside of the curve follows the path of an arc developed about a single center whereas the rail which lies at the inside of the curve successively follows the path of several arcs so developed about different centers that the related wheel-set in its traversal of the curved run maintains a substantially unchanging relationship, in point of the distance therebetween, with respect to each of the two wheel sets which track upon the outer rail.

8. Structure according to claim 1 having guide rollers for at least one of the sets of wheels journal-mounted for rotation about vertical axes placing the guide rollers in bearing engagement with opposite edges of the concerned rail.

9. The combination of a two-rail railway track having at least one curved run and two straight runs joined by said curved run, said rails being of I-beam formation, the wheels of the truck being arranged in sets with each set including a pair of rotatively mounted wheels lying one wheel at one side and the other wheel at the other side of the web of a concerned rail in rolling contact with flanges of the rail, the truck having a frame from which the sets of wheels are suspended, two of said sets being provided for at least one of the rails spaced apart longitudinally of the rail and characterized in that the suspension therefor permits bodily swivel movement of each of said two sets about a vertical axis fixed in relation to the frame, at least one of said sets being provided for the other of the two rails and being characterized in that the suspension therefor permits the set to swing bodily about a horizontal axis located above and extending parallel to the rail.

References Cited in the file of this patent

UNITED STATES PATENTS

| | | |
|---|---|---|
| 1,196,402 | Simko | Aug. 29, 1916 |
| 1,752,026 | Phillips | Mar. 25, 1930 |
| 1,778,332 | Meyer | Oct. 14, 1930 |
| 1,979,329 | Kenurvorst | Nov. 6, 1934 |
| 2,126,336 | Mall | Aug. 9, 1938 |
| 2,182,057 | Chicoine et al. | Dec. 5, 1939 |
| 2,253,363 | Chandler | Aug. 19, 1941 |
| 2,265,385 | Martin | Dec. 9, 1941 |
| 2,472,446 | Standfast | June 7, 1949 |
| 2,544,924 | Herold | Mar. 13, 1951 |
| 3,111,094 | Wylie | Nov. 19, 1963 |